3,014,013
CRYSTALLINE POLYMER
Richard F. Heck, Wilmington, Del., assignor to Hercules Powder Company, Wilmington, Del., a corporation of Delaware
No Drawing. Filed Sept. 14, 1959, Ser. No. 839,970
1 Claim. (Cl. 260—91.1)

This invention relates to the polymerization of vinyl 2-methoxyethyl ether to a high molecular weight crystalline polymer.

In accordance with this invention it has been found that vinyl 2-methoxyethyl ether may be polymerized to a high molecular weight crystalline polymer of outstanding physical properties. The polymer may be formed into films which are tough and clear and which may be oriented. A particularly unique feature of this polymer is its water-solubility. It is unique in that it is soluble in cold water but insoluble in water at temperatures above about 75° C. This is of importance since films prepared from this polymer may then be used for various packaging applications where it is desired to use a water-soluble film. The new polymer may also be used as a warp-size for textile weaving, as a water thickener, etc.

The new crystalline poly(vinyl 2-methoxyethyl ether) is readily obtained by polymerizing vinyl 2-methoxyethyl ether, preferably in an inert liquid organic diluent using as the catalyst the reaction product obtained by mixing an aluminum alkoxide or aluminum alkyl with sulfuric acid. These catalysts may be used as such or they may be further activated by the addition of aluminum trialkyls or complexes thereof with tetrahydrofuran or with metal alkoxides such as aluminum isopropoxide, titanium isopropoxide, etc. Another type of catalyst that is also effective is the reaction product of a metal sulfate such as aluminum sulfate, titanium sulfate, etc., with a metal alkyl or alkoxide as, for example, an aluminum trialkyl, aluminum alkoxide, titanium alkoxide, aluminum alkyl alkoxide, aluminum dialkyl hydride, etc. In general, the polymerization is carried out at a temperature of from about −50° C. to about +50° C. and the amount of catalyst used will generally be within the range from about 0.01% up to about 10% by weight of the monomer. Suitable diluents for carrying out the polymerization are toluene, methylene chloride, diethyl ether, ethyl acetate, heptane, chlorobenzene, benzene, etc.

When the polymerization is carried out as described above, the polymer is readily isolated from the solution or slurry of polymer and diluent by simply removing the diluent by evaporation or other such means. Frequently it is desirable to add a stabilizer as the diluent is removed at an elevated temperature. The polymer may then be purified to remove the catalyst residues by dissolving the polymer in a suitable solvent, filtering to remove the insoluble catalyst and then separating the polymer from the so-purified solution.

In many cases a small amount of amorphous polymer is prepared along with the crystalline polymer. In order to obtain the highest tensile strength it is generally advisable to remove the amorphous polymer. This is readily done by washing the polymer with diethyl ether which dissolves the amorphous polymer, but which does not dissolve the crystalline polymer.

The following examples will illustrate the preparation of poly(vinyl 2-methoxyethyl ether) in accordance with this invention and the unique properties of this new crystalline polymer. All parts and percentages are by weight unless otherwise specified. The molecular weight of the polymers produced in these examples is indicated by the Reduced Specific Viscosity (RSV) given for each. By the term "Reduced Specific Viscosity" is meant the $\eta_{sp/c}$ determined on an 0.1% solution (0.1 g. of the polymer per 100 ml. of solution) of the polymer in chloroform at 25° C. Where the melting point is given, it is the temperature at which birefringence due to crystallinity disappears.

Example 1

The catalyst used in this example was prepared by mixing under nitrogen 18.0 ml. of an 0.58 M solution of aluminum isopropoxide in n-heptane with 0.12 ml. of 100% sulfuric acid and shaking the mixture with glass beads for 2 hours.

A polymerization reactor with a nitrogen atmosphere was charged with 9 parts of vinyl 2-methoxyethyl ether, 23 parts of ethyl acetate and 0.198 part of triisobutylaluminum added as an 0.9 M solution of the tetrahydrofuran complex of triisobutylaluminum in n-heptane. The solution was cooled to 0° C. and an amount of the above catalyst mixture equivalent to 0.24 part of aluminum was added. The reaction mixture was agitated at 0° C. for 5 hours and then at 30° C. for 16 hours, after which the catalyst was destroyed by adding 4 parts of a 1.0 M solution of ammonia in ethanol. The diluents were evaporated under vacuum, and the crude polymer which remained as residue was extracted several times with diethyl ether. The ether-insoluble product was a tough solid. It had an RSV of >1.23 (0.1% in chloroform at 25° C.), and it was shown to be highly crystalline by X-ray.

Example 2

The catalyst used in this example was prepared under nitrogen by mixing 12.0 ml. of an 0.85 M solution of aluminum isopropoxide in n-heptane with 0.06 ml. of 100% sulfuric acid and shaking with glass beads for one hour. The catalyst was then stored at −5° C. until used.

A polymerization reactor with a nitrogen atmosphere was charged with 45 parts of ethyl acetate, 9 parts of vinyl 2-methoxyethyl ether and 0.198 part of triisobutylaluminum added as an 0.9 M solution of the tetrahydrofuran complex of triisobutylaluminum in n-heptane. The solution was cooled to 0° C. and an amount of the above catalyst equivalent to 0.21 part of aluminum was added. The reaction mixture was agitated for 2 hours at 0° C. and for 16 hours at 30° C. The polymerization reaction was stopped by adding 4 parts of a 1.0 M solution of ammonia in ethanol and the polymer was isolated as described in Example 1. There was obtained in this fashion an ether-insoluble polymer which was highly crystalline, had an RSV of 2.06 (0.1% in chloroform at 25° C.) and a crystalline melting point of 73° C.

A film was cast from a 2% methylene chloride solution of the above crystalline poly(2-methoxyethyl vinyl ether). This film was tough, flexible and transparent. It had the following physical properties: tensile strength, 1280 p.s.i.; tensile modulus, 22,500 p.s.i.; and maximum elongation, 230%. This crystalline polymer was soluble in cold water, acetone, methanol, dioxane, benzene and chloroform and was insoluble in hot water, i.e. at a temperature above about 75° C.

Example 3

The catalyst used was prepared by mixing under nitrogen 144 ml. of an 0.85 M solution of aluminum isopropoxide in n-heptane with 1.44 ml. of 100% sulfuric acid and shaking the mixture with glass beads for 2 hours. This reaction mixture was allowed to stand at room temperature overnight and then the catalyst slurry was stored at −5° C. until used.

A polymerization reactor was charged with 1650 parts of methylene chloride which had been carefully dried by distillation of phosphorous pentoxide. The reactor was then flushed with nitrogen and 5.3 parts of aluminum isopropoxide was added as an 0.72 M solution in n-heptane, after which there was added 600 parts of pure vinyl 2-methoxyethyl ether (purified by distillation from sodium and fractionation and having a boiling point of 108.7 to 109.1° C.). The reaction mixture was agitated and cooled to 5° C. while an amount of the above catalyst slurry equivalent to 0.35 part of aluminum was added every 5 minutes for one hour and then at the rate of 0.87 part of aluminum every 5 minutes for the second hour. After 3 hours of agitation at 5° C., an additional amount of the catalyst slurry equivalent to 3.4 parts of aluminum was added in 5 portions at 30-minute intervals. The reaction mixture was then allowed to warm up to room temperature and was agitated at room temperature for 16 hours. The catalyst was inactivated by adding 60 parts of a 1 M solution of ammonia in ethanol. After adding 60 parts of a 1% solution of 4,4'-thiobis(6-tert-butyl meta cresol) in ethanol as a stabilizer, the reaction mixture was evaporated to dryness under vacuum. The crude polymer which remained as a residue was extracted several times with diethyl ether until no more material was removed by the ether. The insoluble polymer which remained was then dissolved in methylene chloride, the solution was filtered and 10 parts of the above stabilizer solution in ethanol was added, after which the solvent was removed. The poly(2-methoxyethyl vinyl ether) so obtained was a solid, light yellow-orange colored polymer. It was highly crystalline by X-ray and had an RSV of 2.3 in an 0.1% solution in water at 25° C. and an RSV of 2.4 in an 0.1% solution in chloroform at 25° C.

A portion of this polymer was compression-molded to a 10-mil film at 85° C. using a molding cycle of 10 minutes at 5000 p.s.i. on a 1¼ inch ram. This film was readily oriented by cold drawing 300% at 25° C. to yield a film with a tensile strength of 5300 p.s.i., a tensile modulus of 18,500 p.s.i., and a maximum elongation of 175%. A portion of the above crystalline poly(2-methoxyethyl vinyl ether) was further purified by dissolving it in cold water, filtering the solution and then heating the solution to 100° C. to precipitate the polymer. This solution and reprecipitation process was again repeated. The crystalline melting point of this purified polymer was 69° C. and on analysis it was shown to contain 58.62% carbon (theory 58.81%) and 9.95% hydrogen (theory 9.87%).

What I claim and desire to protect by Letters Patent is:

As a new composition of matter a solid crystalline poly(2-methoxyethyl vinyl ether) soluble in cold water.

References Cited in the file of this patent

UNITED STATES PATENTS 2,748,083　　Hollyday et al. ---------- May 29, 1956